No. 623,761. Patented Apr. 25, 1899.
A. G. BAYLES.
ROLLER SKATE.
(Application filed Aug. 20, 1898.)

(No Model.)

WITNESSES:
C. Nordfors
Henry M. Read

INVENTOR
Alfred G. Bayles,
BY
Garry P. Van Wye.
ATTORNEY.

UNITED STATES PATENT OFFICE.

ALFRED G. BAYLES, OF NEW YORK, N. Y.

ROLLER-SKATE.

SPECIFICATION forming part of Letters Patent No. 623,761, dated April 25, 1899.

Application filed August 20, 1898. Serial No. 689,084. (No model.)

*To all whom it may concern:*

Be it known that I, ALFRED G. BAYLES, a citizen of the United States, residing at New York, in the county and State of New York, have invented a new and useful Improvement in Roller-Skates, of which the following is a specification.

This invention relates to roller-skates; and the objects thereof are to provide new and improved means to secure the roller upon the axle, and, secondly, to provide means to reduce the friction on the axle and to provide for the longitudinal adjustment of the same. I attain these objects by means of the mechanism illustrated in the accompanying drawings, in which—

Figure 1:
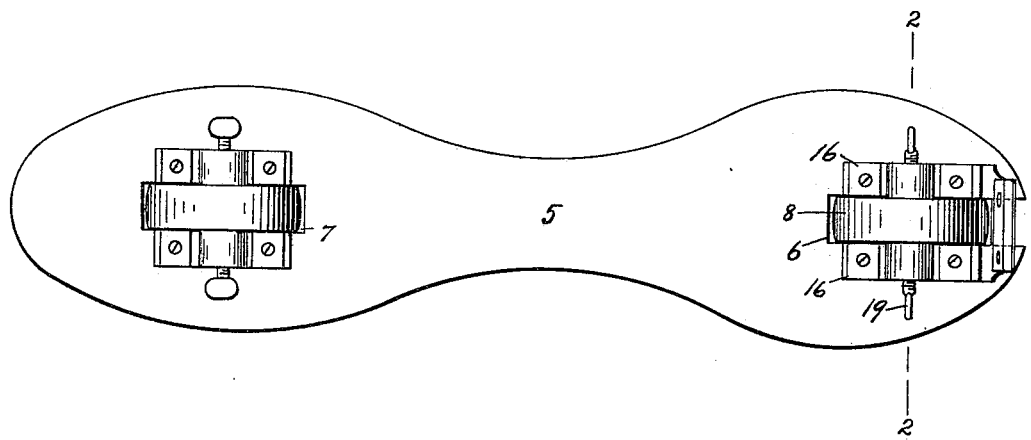
Figure 2:
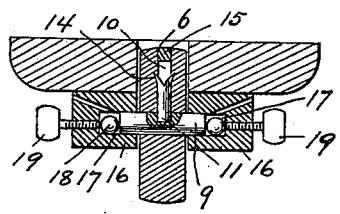
Figure 3:
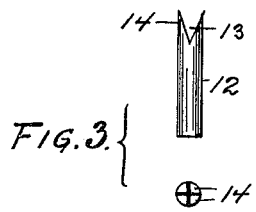

Figure 1 is a plan view of a roller-skate provided with my improvements. Fig. 2 is a transverse vertical section on the line 2 2 of Fig. 1, and Fig. 3 is an elevation and end view of a pin which I employ.

Similar numerals refer to similar parts in each of the views, and in the practice of my invention I provide a base-plate 5, which may be secured to the foot in any desired manner, and the base-plate 5 is slotted at each end, as shown at 6 and 7, and in each of said slots I mount a roller or wheel 8, which is secured upon the axle 9 in the following novel manner: I first place the wheel 8 upon the axle 9, and then by suitable guides I bore a hole 10 through the said wheel into the axle for a short distance, as shown at 11. I then insert a pin 12, Fig. 3, which is slotted at one end, as shown at 13, whereby a plurality of prongs 14 are formed. When the pin 12 is driven home, I insert a pointed tool of any convenient form, and by driving the same between the prongs 14 the prongs are spread and pressed into the wood forming the wall of the hole 10, and the pin is thus effectually prevented leaving its seat in the axle. I also insert a small plug 15 in the outer end of the hole 10 to close the same.

In mounting the wheels 8 I provide castings 16, each of which is bored to form journal-boxes 17, in each of which I mount a ball 18, each of which is less in diameter than the diameter of the axle 9, and the ends of the axle 9 bear against the balls 18. I also provide set or adjusting screws 19, which bear against the balls 18 and by which the position of the said balls in the boxes is determined, whereby the axle 9 may be adjusted longitudinally, and any wear may also be taken up, as will be readily understood.

In operation the foot is naturally turned sidewise in skating, especially in skates where but a single wheel is used at the front and rear, and by this construction the balls will securely hold the wheel in position and at the same time the ball will prevent an excess of friction.

The pin 12 provides a very cheap and effective means to keep the wheel stationary on the axle, and the entire construction is very simple and can be manufactured at a comparatively small cost, and I reserve the right to make all changes which fairly come within the scope of my invention.

Having thus described my invention, what I claim as new, and desire to secure by Letters Patent, is—

In roller-skate wheels, a wheel mounted upon an axle and provided with coinciding apertures, a pin with a split, or bifurcated point adapted to be driven in said apertures whereby the points are separated to lock the wheel in place, antifriction-balls at the ends of the axles or journals, and adjustable thumb-screws for adjusting said balls.

In testimony that I claim the above I have hereto affixed my signature in the presence of two witnesses.

ALFRED G. BAYLES.

Witnesses:
JAMES GRANT,
SIMON MCGROREY.